May 28, 1940.  M. G. FIEDLER  2,202,761

INTERNAL COMBUSTION ENGINE

Original Filed July 31, 1935  6 Sheets-Sheet 1

Fig. 1.

Inventor
Max George Fiedler
by his Attorneys
Howson & Howson

May 28, 1940.    M. G. FIEDLER    2,202,761
INTERNAL COMBUSTION ENGINE
Original Filed July 31, 1935    6 Sheets-Sheet 3

Inventor
Max George Fiedler
by his Attorneys
Howson & Howson

May 28, 1940.  M. G. FIEDLER  2,202,761
INTERNAL COMBUSTION ENGINE
Original Filed July 31, 1935    6 Sheets-Sheet 5

Fig. 20. Idling

Fig. 22. Idling

Fig. 21. Under Load

Fig. 23. Under Load

Inventor
Max George Fiedler
by his Attorneys

Patented May 28, 1940

2,202,761

UNITED STATES PATENT OFFICE 2,202,761

INTERNAL COMBUSTION ENGINE

Max George Fiedler, Media, Pa.

Application September 7, 1938, Serial No. 228,874, which is a division of application Serial No. 188,017, January 31, 1938, which is a continuation of application Serial No. 34,134, July 31, 1935. Divided and this application December 23, 1938, Serial No. 247,508

7 Claims. (Cl. 123—69)

This invention relates to compression ignition engines of the oil-burning type, or that type usually referred to as Diesel engines, and is a division of my prior application Serial No. 228,874 entitled Method of operating solid fuel injection engines, filed September 7, 1938, which was a division of my copending application Serial No. 188,017, filed Jan. 31, 1938 for Engine and method of fueling the same which itself was a continuation of my prior application No. 34,134, filed July 31, 1935, for Engine.

It relates particularly to a construction capable of operation in the automotive speed sizes and ranges, and without detonation throughout such speed ranges, and to a method of fueling the engine contributing principally to the attainment of the foregoing objects.

It is well known that the combustion of hydrocarbons may be either a direct oxidation or a decomposition followed by oxidation of the destruction products. In practice, there is a race between the two processes, the conditions being more favorable to hydroxylation when a fuel has been properly divided and mixed with air before it is burned, at which time the flame is blue and has no tendency to soot. The conditions are more favorable to destructive combustion when the fuel is exposed very suddenly and in a highly vaporized condition to flame temperatures, the fuel particles decomposing rapidly before they can find oxygen, and under these conditions there is a yellow radiation caused by the burning carbon and a tendency to form soot.

In the ordinary Diesel engine, air is compressed to the greatest possible extent to prevent ignition lag, and a readily ignitable oil is employed for the same reason. I have found that in high speed Diesel engines having a high compression ratio the first fuel entering the combustion space does not ignite but meets with the turbulent compressed air. Part of the entering fuel will mix with more or less turbulent air until, in some part of the chamber, a suitable mixture for self-ignition has been established and combustion will start. If the duration of injection is continued after combustion has occurred, this fuel will meet air which is not only strongly turbulent but mixed with combustion residue. As injection continues, the air becomes saturated with the products of combustion until the interference with further combustion is so serious that free carbon will be generated. In the ordinary Diesel this occurs at a point where approximately 50% of the available air has been consumed. The time necessary to establish the proper mixture for the first auto-ignition is equal to the ignition lag and is influenced to a great extent by turbulence during injection, and also by the shape of the combustion chamber, the spray characteristics, duration of injection, and, to some extent, by the compression pressure. To a large extent the ignition lag in the engine is directly dependent upon the degree of turbulence, increasing with such turbulence due to the fact that the air usually rotates at high speed around the cylinder axis throwing the entering fuel into the coldest zone adacent the cylinder wall. This can only be counteracted through high compression and it follows that previous engines having high turbulence must work under very high compression pressures, often as high as 40 to 50 atmospheres, and even under these circumstances detonation frequently results.

Analyzing the standard spray characteristics as produced today in the usual solid fuel injection engines, it is found that fuel, through being subjected to high injection pressures (3,000 to 20,000 lbs.) and through being forced through very small orifices is substantially in a vapor stage and thus readily subject to "cracking." In addition to that, as has been photographically demonstrated, the spray itself is very compact and cannot be broken up even by the most violent turbulence. This spray is, therefore, exposed to high compression temperatures without the ability to mix with air and the result is, inevitably, "cracking." The combustion will, therefore, follow the second type mentioned above and since part of the combustion will be a hydrogen-oxygen or oxygen-methane reaction at the high temperatures and pressures existing in Diesel engines, will undoubtedly, be extremely violent and destructive. Furthermore, since the injection is through such fine orifices, the injection period necessarily, and of course purposely under the Diesel system, continues after combustion has actually begun and, obviously, the later injected fuel will crack producing further hydrogen-oxygen reactions.

I have discovered that the proper operation may be provided by observing the following precepts:

(1) In small bore, short stroke engines the use of a relatively large combustion space and the maintenance of the air in this space in a high state of turbulence in order that the mixture may be as complete and rapid as possible while maintaining the turbulence of such character that there is no localizing disturbance or deformation of the jet.

(2) The instantaneous, or substantially instantaneous injection of the fuel into the combustion chamber, and the use of low compression pressures (approximately 240 pounds at the time of starting injection) thereby causing a combustion lag, in order that all of the fuel may be delivered thereto before combustion begins without regard to the speed or load conditions under which the engine is operating.

(3) The introduction of the fuel spray into the combustion chamber in the form of a loosely bonded liquid foam and under relatively low injection pressures (preferably less than 1200 lbs.) thereby enabling the relatively cool fuel to readily combine with the air in the combustion chamber and establish an auto-ignition mixture as rapidly as possible, and, furthermore, promoting the combustion lag during which establishment of the mixture is assured.

An important object of the invention is the provision of a means for super-charging the working cylinder so constructed and arranged that losses from interposition of receivers or recompression of any appreciable volume of air handled by the compressor unit is eliminated.

A further object of the invention is the provision of a solid fuel injection cycle in which the injection period is in all phases of operation of the engine of such duration that all the fuel has entered the combustion chamber before combustion actually starts.

Obviously, sudden injection of fuel in this manner is impractical in a quiescent chamber and, accordingly, a further object of the invention is to provide a structure wherein high turbulence is assured, the turbulence being non-directional in character, and which provides this turbulence without the use of any artificial or additive means for producing the same.

Another object of the invention is the injection of fuel in the engine in the manner outlined in the second and third precepts above.

Other objects of my invention are to provide an engine having two cylinders and pistons operatively mounted therein, one of which cylinders is the main working cylinder and the other cylinder is the supercharging cylinder and utilizing both of the cylinders as compression chambers; to provide a passageway between the working ends of the cylinders controlled by a valve through which the air is forced and retained in the main cylinder during the firing of the fuel mixture; to provide a novel form of valve for transferring the air from one cylinder to the other, in which valve a small volume of air under pressure is retained when the valve is closed and again released during the next succeeding operation of the pistons, thus providing air under pressure which will assist in building up the pressure in the cylinders when the next compression stroke takes place; to provide a novel form of rotary inlet valve for controlling the admission of air to the compression cylinder; to provide a novel means for scavenging the main cylinder at the end of the working stroke of the piston; to provide an engine in which the scavenging air is compressed by both of the pistons in the crank casing and controlled by the movements of the piston for transferring the air for scavenging purposes in a novel manner; to provide a novel construction and manner of operating the inlet and transfer valves; and to construct the engine so that any number of cylinders may be combined for operating upon the same crank shaft and to arrange the casing, of which the cylinders form a part, with novel inlet and transfer passages for controlling the inlet air, combustion mixture, and the scavenging air.

The present application relates particularly to the construction of the engine per se, the remaining features of my invention being claimed in co-pending applications Serial Numbers 174,238, filed November 12, 1937, for Fuel nozzle for solid fuel injection engines and method of operating the same; 188,017, filed January 31, 1938, for Engine and method of fueling the same; and 228,875, filed September 7, 1938, for Fuel nozzle for solid fuel injection engines.

The above objects, together with various novel features of construction and arrangement of the parts, which will be more fully hereinafter described and claimed, constitute my invention.

Referring to the accompanying drawings.

Figure 1:
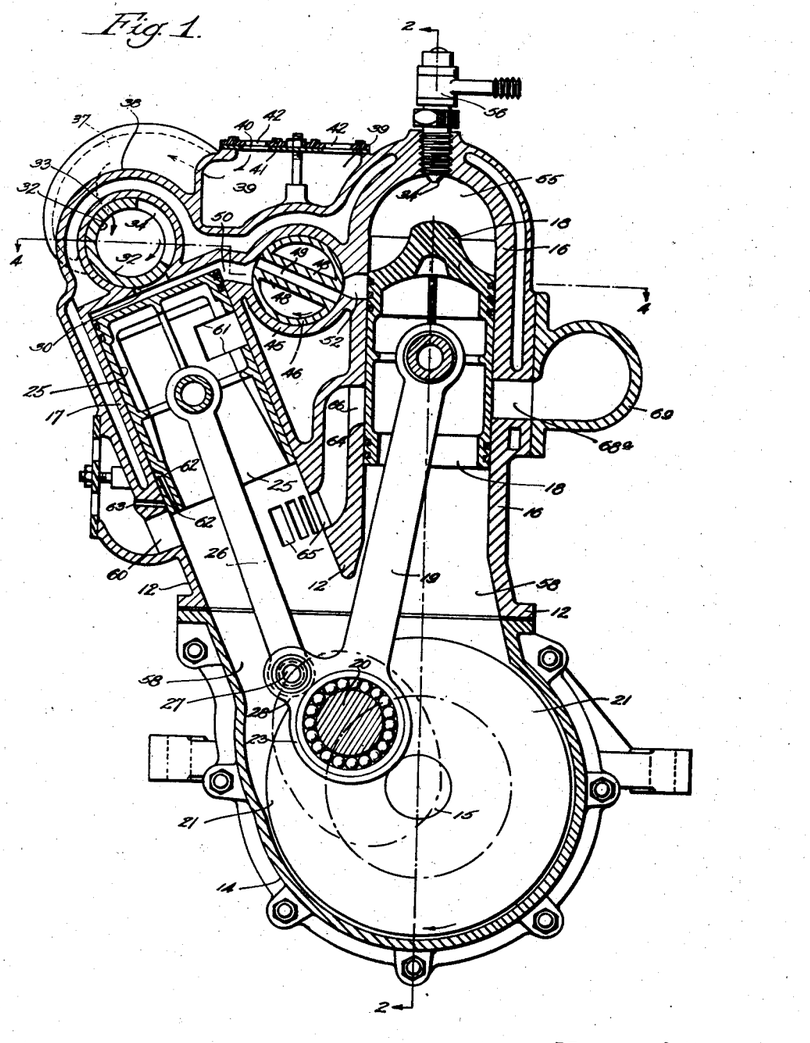
Fig. 1 is a vertical, transverse sectional view of the engine through the main and supercharging cylinders.
Figures 2, 3, 4, 5:
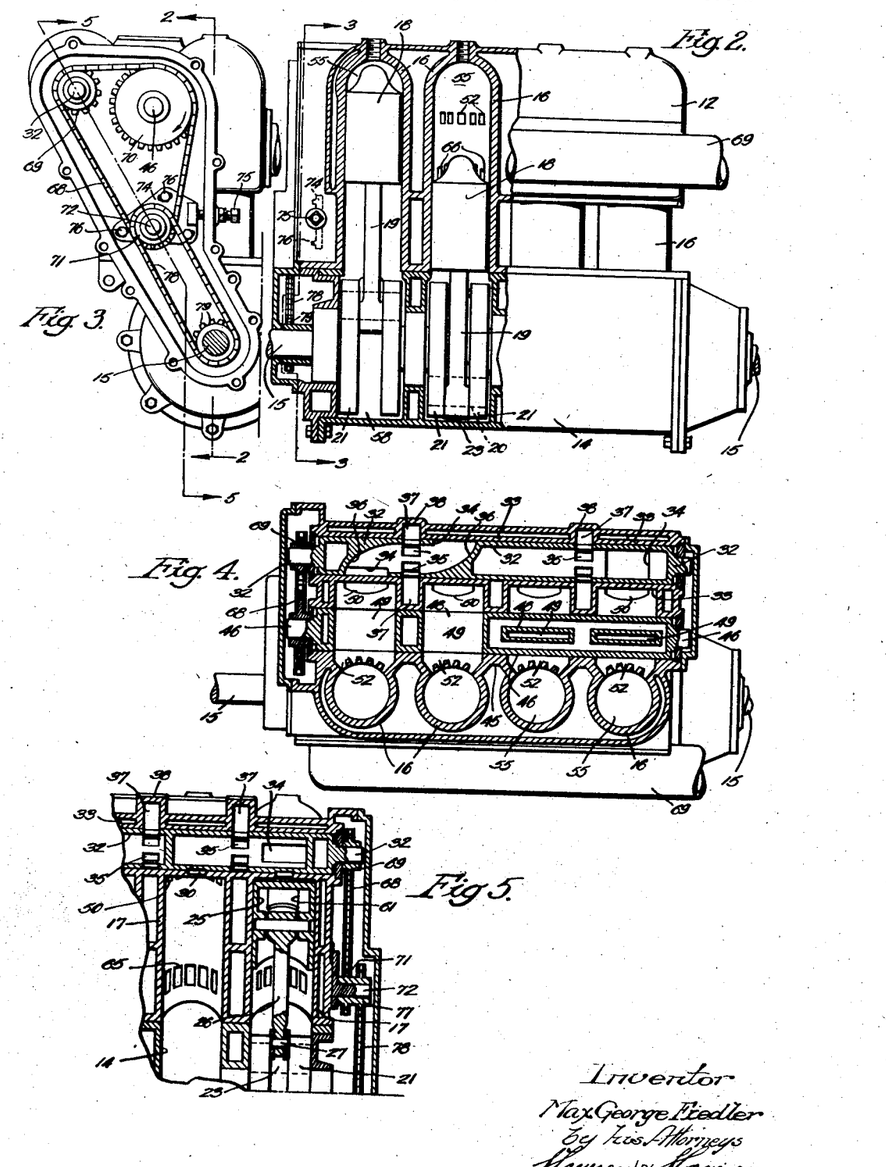
Fig. 2 is a longitudinal sectional view, as on line 2—2 Figs. 1 and 3, partially in elevation, and drawn on a smaller scale.
Fig. 3 is a transverse vertical sectional view, as on line 3—3 of Fig. 2.
Fig. 4 is a horizontal sectional view as on line 4—4 of Fig. 1, drawn on a smaller scale.
Fig. 5 is a partial longitudinal sectional view as on line 5—5 Fig. 3.
Figure 6:
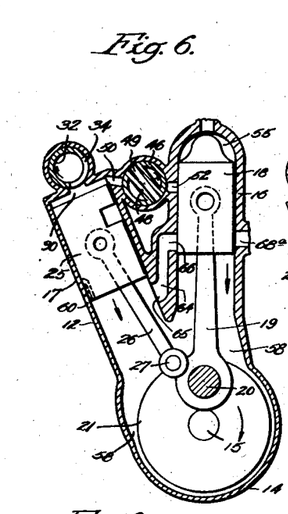
Figs. 6 to 12 are diagrammatic sectional views of the engine showing the pistons at different positions throughout the cycle of operation.
Figure 7:
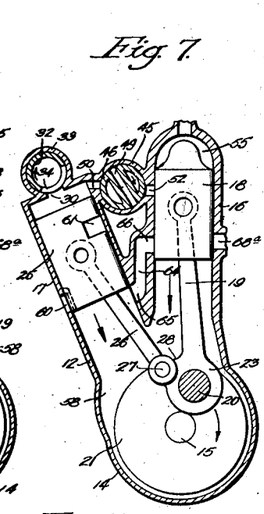

My first precept is attained by use of the engine more particularly shown in Figs. 1 to 12 in which 12 represents the main casing and 14 represents the crank casing of the engine, in which latter a crank shaft 15 is rotatably mounted. Within the casing 12 are formed the main cylinder 16 and the supercharging cylinder 17. The cylinders 16 and 17 form a complete unit, which may be duplicated throughout the length of the engine, as shown in Figs. 2 and 4.

A main piston 18 is operatively mounted in the main cylinder 16 and is pivotally connected with a connecting rod 19, which latter is pivotally mounted upon a crank pin 20, secured between disks 21 of the crank shaft 15. Within the supercharging cylinder 17 is slidably mounted a piston 25, with which is pivotally connected a connecting rod 26, pivotally attached by a pin 27 to a lug 28 forming part of the head 23 of the connecting rod 19. By this arrangement the piston 25 travels in advance of the piston 18. The crank pin 20 and the pivot pin 27 describe arcs as indicated in dot and dash lines, Fig. 1 during the revolution of the crank shaft 15.

The supercharging cylinder 17 is provided with an inlet opening 30 for admitting air to the cylinder 17. The opening 30 is controlled by a rotary valve 32 mounted in a cylindrical casing 33 forming part of the casing 12 of the cylinders. The axis of the valve 32 extends in parallel relation with the main shaft 15, and the cylindrical wall of the valve 32 is provided with openings 34 through which air is supplied to the supercharging cylinders 17. The openings 34 are arranged at different radial positions throughout the length of the valve, there being one opening 34 for each cylinder 17, throughout the length of the engine. As the valve 32 is rotated each opening 34 in turn registers with an inlet opening 30 formed in each of the cylinders 17. The valve 32 is of hollow construction, as shown in Fig. 4, and is provided with inlet openings 35 located between every two outlet openings 34. The valve 32 is provided with curved walls 36, extending from the axial core of the valve to the edges of the openings 34, thus air entering the inlet openings 35 will be directed in opposite directions to two of the cylinders 17 through the openings 34, when the latter register with the openings 30 of the cylinders 17.

The inlet openings 35 of the valve 32 are surrounded by annular chambers 37 formed in an enlarged portion 38 of the casing 12. The chamber 37 communicates with an inlet chamber 39, (see Fig. 1), into which air is admitted through openings 40 formed in the plate 41. A damper plate 42 is slidably mounted upon the plate 41 for reducing the quantity of air admitted when starting the engine.

The casing 12, in which the cylinders are formed, is provided with a circular casing 45, in which is rotatably mounted a cylindrical transfer valve 46, which extends the length of the engine in parallel relation with the main shaft 15 and is adapted for controlling the transfer of air from the supercharging cylinders 17 to the main cylinders 16, as shown in Figs. 1 to 4. The transfer valve 46 is provided with parallel webs 48, between which is formed a radial passageway, or transfer chamber 49, within the valve 46, which chamber 49 is of relatively large proportions and is adapted to retain air under pressure when the valve is closed and release the pressure when the valve is again opened, thus assisting in boosting the pressure of the charging air upon the next operation of the pistons, as will be more fully hereinafter described.

The transfer valve 46 is located between the cylinders 16 and 17 and is adapted to register with the transfer duct 50 formed in the cylinder casing and communicating at one end thereof with the upper end of the supercharging cylinder 17 for supplying air from said cylinder 17 to the valve 46. The cylinder 16 is provided with ducts or ports 52 formed in the cylindrical wall thereof, which communicate with the passageway or chamber 49 formed in the transfer valve 46, and which ports 52 are closed by the piston 18 during the latter part of its compression stroke. When the passageway or chamber 49 of the valve 46 registers with the passageways 50 and 52 the air may be forced by the supercharging piston 25 through the valve passageway 49, into the combustion chamber 55 of the main cylinder 16, unless the port or passageway 52 is closed by the position of the main piston 18. At the time the main piston closes port 52, the valve passage 49 is still in communication with cylinder 17 and continues such communication until the piston 25 reaches the upper end of its stroke. The cylinder 16 is provided with a fuel injection valve 56 for injecting fuel into the combustion chamber 55, as shown in Fig. 1.

The crank casing 14 and the lower portion of the casing 12, adjacent to the crank casing, form a compression chamber 58 in which air for scavenging purposes is compressed by the pistons. The cylinder casing 12 is provided with an air intake port 60, which port is opened to the atmosphere when the piston 25 is in the position shown in Fig. 1. A passageway 62 is formed in the wall of the piston 25, which registers with an oil supply port 63 formed in the cylinder wall when the inner end of the piston 25 is uncovering the port 60, and is provided for admitting lubricating oil adjacent to the air inlet port 60, for spraying the oil into the scavenging air for lubricating the crank shaft, pistons and cylinder walls.

Figure 8:
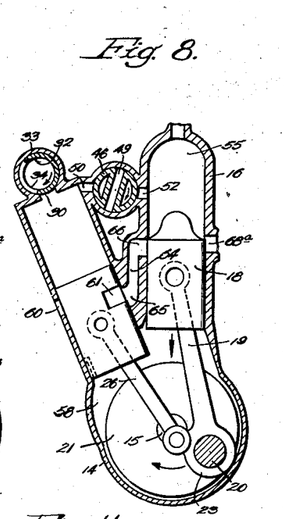
Figure 9:
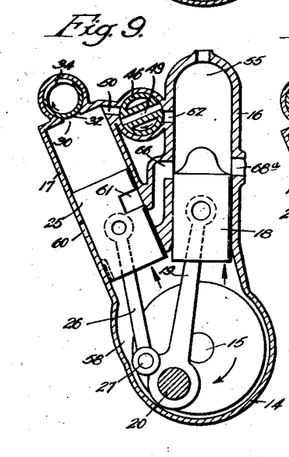
Figure 10:
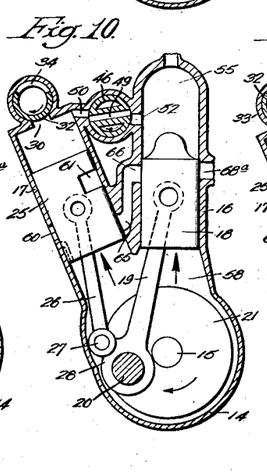
Figure 11:
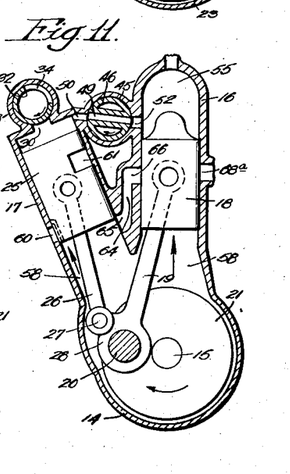
Figures 12, 13, 14:
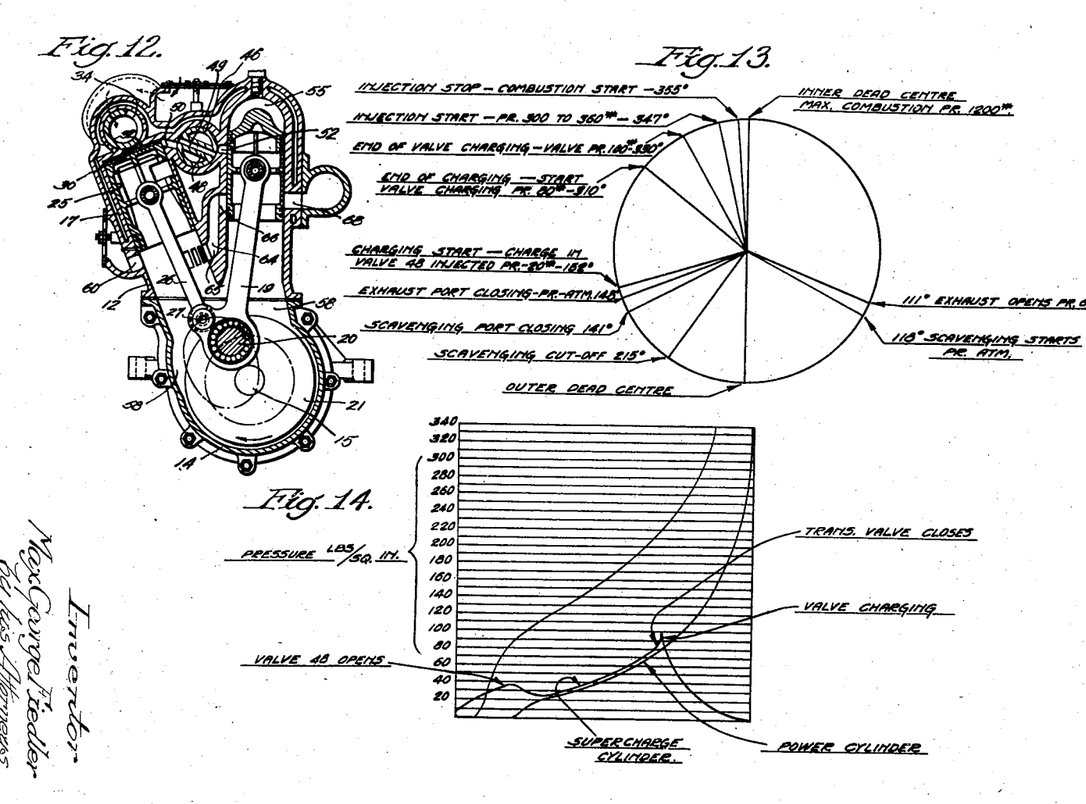
Fig. 13 is a cycle diagram of an engine constructed in accordance with my invention.
Fig. 14 is an indicator card showing the pressure cycle of the engine.

The piston 25 is provided, in the cylindrical wall thereof, with an opening 61. The casing 12 is provided with a scavenging transfer passageway 64 which is located in the casing 12 between the cylinders 16 and 17. Ports 65 are formed in the wall of the cylinder 17 which form a communication from the crank casing chamber 58, through the passageway 64, to the cylinder 16, through ports 66 formed in the latter. When the piston 25 is moved to the position shown in Fig. 8, the opening 61 in the piston 25 will register with the ports 65, thus admitting the scavenging air through the passageway 64 and the ports 66 to the cylinder 16. Said ports 66 are so located relatively to the movement of the piston 18 that the latter will close said ports 66, except when the piston is positioned adjacent to the end of its working stroke, as shown in Figs. 8 and 9. When the pistons are in the positions shown in Figs. 8 and 9, the air which has been compressed in the chamber 58, by the movements of the pistons toward the crank shaft, will be discharged through the opening 61 in the piston 25, the scavenging passageway 64 and the ports 66 for scavenging the combustion chamber 55, in the main cylinder. The cylinders 16 are each provided with exhaust ports 68a which communicate with the exhaust manifold 69.

The valves 32 and 46 are rotated by means of a belt, or chain 68, which passes around the pulleys or sprocket wheels 69 and 70 secured upon the reduced ends of the valves, as shown in Figs. 2 to 5. The belt 68 is driven by a wheel 71, which is rotatably mounted upon a shaft 72, secured upon a bearing 74, which is adjustably secured upon the end of the engine casing 12 by means of an adjusting screw 75 and locking bolts 76, which latter pass through enlarged holes formed in the bearing 74. The gear wheel 71 is integrally formed with a wheel 77 driven by a belt or chain 78, which in turn is driven by a wheel 79, secured upon the crank shaft 15. The belts 68 and 78 may be tightened by means of the adjustable bearing 74 which is movable relatively to the bolts 76 by the adjusting screw 75.

The wheel 70 upon the transfer valve 46 is twice the size of the wheel 71, thus the valve 46 will rotate at one-half the speed of the crank shaft 15, and the air intake valve 32 will rotate at the same speed as the crank shaft 15. Since the scavenging air admitted through port 66 is under compression it will tend to swirl violently in cylinder 16 and in a definite path. If it were fully compressed in this condition in combustion chamber 55 such definite directional movement would adversely affect the injected fuel tending to localize the same. However, the constant transfer of air having a different direction of movement from cylinder 12 to cylinder 16 during the major portion of the compression stroke disrupts the direction of turbulence and transforms it to the non-directional type.

The second precept may, obviously, be obtained in a variety of fashions as, for example, by multiplying the number of nozzles employed and thereby increasing the effective injection area so that the period necessary to injection of a predetermined amount of fuel may be reduced to the desired point. I have found that the injection period should not exceed 10° of crank travel, and preferably should be confined to approximately 7° thereof. Since the engine is now to operate as a constant volume engine, all of the fuel being injected before ignition, it is, of course, desirable that this fuel be entered prior to the arrival of the working piston 18 at top dead center, the arrangement being preferably that illustrated in the cycle diagram forming Fig. 13, in which the injection is illustrated as occurring in advance of the top dead center, a distance corresponding to the average combustion lag. While the injection period might be delayed beyond the point illustrated, this will, obviously, result in a loss of efficiency, the operation of the engine under such circumstances being substantially that of gasoline engines operating with a retarded spark.

The compression pressure of the engine must be kept sufficiently low to insure a combustion lag enabling complete injection of the charge prior to initial combustion, and must be sufficiently rapid to insure against vapor formation. It will be noted that this is directly contrary to Diesel practice in which the production of highly vaporized sprays is sought and in which the compression pressures are carried to the highest possible point in order to avoid ignition lag.

Such an arrangement as that already suggested will result in a highly improved operation of the engine, but to insure complete elimination of detonation, a smooth operation of the engine over a wide speed range, and an economical fuel injection system, the construction should be restricted to a single injection nozzle of peculiar characteristics. As is well known to those familiar with Diesel construction as hitherto practiced, the usual nozzle comprises a valve lifted by the injection pressure and thus permitting the escape of the fuel to the cylinder through orifices 80 (see Fig. 15). Due to the relatively large area of the lifting surface 81 provided on such valves, with the attainment of injection pressure, the valve is violently thrown upwardly against a stop 82 and there remains throughout the injection period, the minute discharge orifices providing sufficient back pressure to maintain it in this position.

Figures 15, 16:
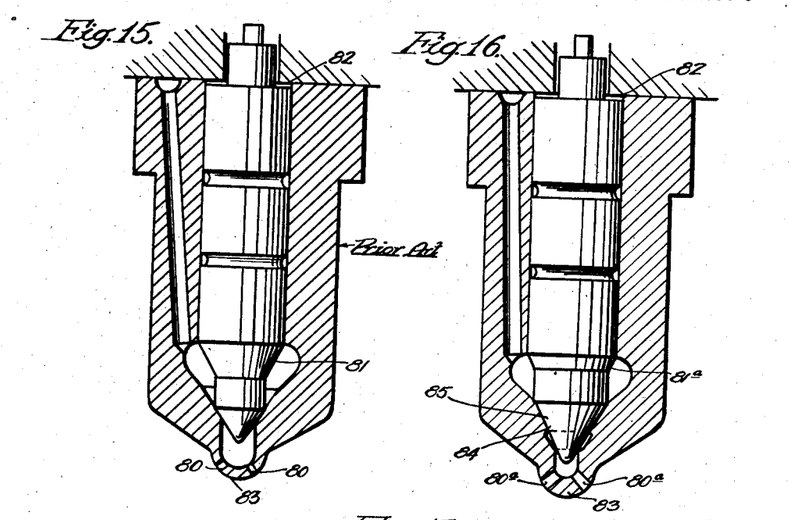
Fig. 15 is a conventional injection nozzle of the type at present in use.
Fig. 16 is a sectional view through a nozzle modified for use in accordance with my invention.

I have found that by materially reducing the lifting area of this valve, as at 81a in Fig. 16, and increasing the diameter of the discharge openings 80a to an extent such that the pressure beneath the valve is constantly relieved and at the same time providing the valve with a relatively heavy spring of high frequency, the valve will chatter against the seat, or rather upon the liquid passing over this seat, reducing the fuel to a loose foam of liquid particles which is discharged through the openings 80a at a much reduced pressure and in relatively large particles. The increase of the size of the openings 80a requires a thickening of the wall 83 through which these openings are formed in order that they may properly guide the fuel and insure correct distribution thereof. The fuel then has a spray characteristic typified in Fig. 17, and is in the form of well spaced, loose liquid particles as compared with the usual injection practice, which particles may be readily taken up and surrounded by the air in the combustion chamber, with the result that a thorough commingling is obtained insuring proper proportioning of air to fuel at the time the mixture attains the flash point. As indicated above, the openings should be much larger than those ordinarily employed, and in an injector found to give excellent results 6 openings were employed of a diameter of .9 millemeter as compared to 6 openings having .3 millimeter utilized in the usual injection nozzle; in other words, an increase of approximately 900 per cent in injection area.

In general, it may be stated that the area of the openings must exceed the maximum area afforded by the valve seat 84 and the valve 85 during the injection period. It will be obvious that the valve, during the injection period, acts not only as a valve but likewise as a flexible orifice, through which the fuel may enter, exercising upon the fuel because of its flexibility an agitating action producing a relatively loose foam. The valve seat itself should be of relatively large diameter in order to obtain large impact relief areas with a minimum lift and the valve spring should be strong enough so that at minimum pressure it will counteract the inertia effect of the valve stem under impact and continually attempt to reseat the valve and thus produce the chattering action on the fuel passing over the seat. To this end, as previously stated, a heavy valve spring having a high frequency is preferable.

Figures 18, 19:
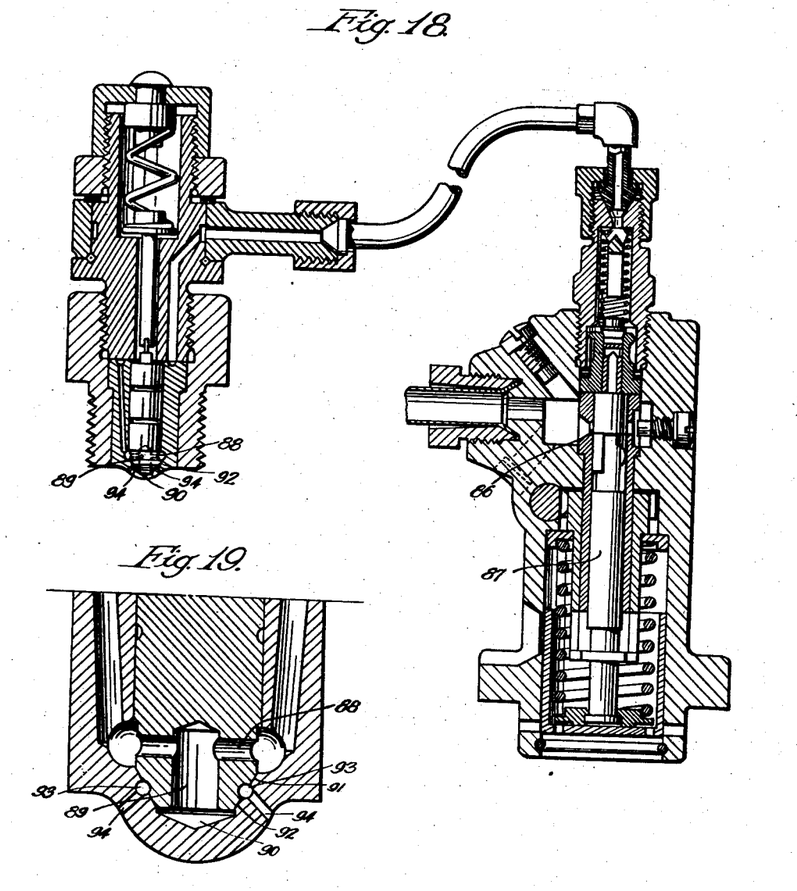
Fig. 18 is a sectional view showing a preferred type of nozzle and the pump connection thereto.
Fig. 19 is a highly enlarged sectional view through a portion of the nozzle of Fig. 18.
Figure 22:
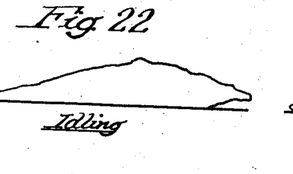
Figs. 22 and 23 are card diagrams taken under identical conditions with those in Figs. 20 and 21, but with use of the new type of injection and operation.
Figure 23:
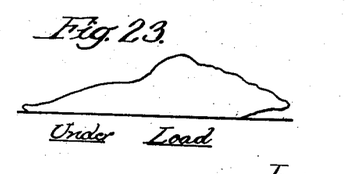

While the injection nozzle of Fig. 16 provides a highly improved operation, it was found in practice that this nozzle, after heating to approximately 700° caused detonation. It was finally determined that the foam formed in advance of the nozzle tip by the chattering of the valve upon its seat tended to vaporize at the nozzle tip with resulting detonation in operation. For this reason, the valve of Fig. 18 was developed. In this valve the lifting area is transferred to the center of the valve, ports 88 communicating with a passage 89 opening through the bottom of the valve and into a chamber 90 at the nozzle tip. The valve seat is divided into two sections 91 and 92 by a groove 93 aligned with the discharge ports 94. By this construction all foaming fuel is discharged from the valve and the tip of the nozzle is kept cool by maintenance of a solid body of the fuel thereagainst.

Tests with an injection nozzle of this type have proven conclusively not only its value in improving the explosion characteristics of the engine but likewise that for maximum efficiency certain definite characteristics and proportions should be employed in the injection system exterior to the nozzle. I have found, for example, that the injection at the nozzle is responsive not so much to the injection to the system by a measuring pump of a predetermined amount of fluid as to the impact resulting on the fluid line from the initial opening of the fuel line to receive the fuel displaced by the pump. This is evidenced by the fact that the injection period does not appreciably vary through a considerable range of injection as regards the amount of fuel which passes through the nozzle. With the same nozzle it is possible to inject 10 to 100 cubic millimeters of fuel to the cylinder in the same interval. This is apparently due to the fact that with a greater fuel injection a greater residual pressure exists in the line connecting the pump and nozzle and, accordingly, the impact blow resulting on initial injection is transmitted with greater force to the valve. The injection apparently immediately follows the closing of the intake openings 86 of the pump by the piston 87 thereof. The speed of operation of the pump piston apparently has little effect on the injection although it is found that a greater fuel injection can be obtained through use of a relatively slow operation of the piston. In actual use, sharp, medium and eccentric cams have been utilized, and it is found that the eccentric cam gives much the best results, the sharp cam tending to upset equilibrium of the system. The indications are, accordingly, to the use of a large diameter pump operated by an eccentric cam through a short plunger travel.

I have, further, found that there are definite characteristics necessary to the discharge line connecting the pump and nozzle if proper injection characteristics are to be obtained. For example, a discharge nozzle having openings of the size above mentioned employed in an engine of the character described must have a discharge line of definite length; in the construction under test, .533 meter. It is found that a shorter line causes double injection; that is to say, there are two definitely separated injection periods for each operation of the pump, apparently caused by the fact that the shorter line does not provide the dampening effect necessary and the impact blow becomes too great for the system. On the other hand, a longer line causes double injection, for the apparent reason that there is too great a volume of liquid in the system causing a lag. It might appear that the presence of too much fluid in the system occasioned by the use of a long line might be overcome by a reduction of the diameter of the discharge line, but this is not the case, for it is found that unless the diameter of the line is kept quite large the impact blow creates such high speed in the column that it cannot be controlled by the valve or flexible orifice. As a matter of fact, I have found that a relatively large line as compared to the standard line of 0 to 2 millimeters in diameter is essential and in practice employ a line at least 3, and preferably 4 millimeters in diameter. In any case, the line must be large enough to prevent too great an impact and, in general, the larger the amount of fluid to be injected, the larger the line should be. It has also been found that the amount of fuel injected through a given period can be varied within given limits by variation of the size of the pump employed. For example, a pump having a piston 10 millimeters in diameter provides an injection range between 10 and 100 cubic millimeters, while with the same line and conditions a pump having a piston of 13 millimeters in diameter provides an injection range of between 10 and 160 cubic millimeters in the same injection period.

I have determined that the temperature range at which injection should take place in order to permit the proper ignition lag enabling all of the fuel to be injected before combustion starts is provided by a compression pressure having a minimum of 120 pounds per square inch and a maximum of 400 pounds per square inch, the most efficient range being between 330 pounds and 360 pounds to the square inch. In this range the temperatures are sufficiently high to cause rapid heating of the material and are at the same time below the decomposition temperature when the fuel is delivered to the cylinder in the form of a coarse spray.

It will be noted that there is again a sharp deviation from the ordinary Diesel practice and this deviation assists in providing the necessary lag enabling the establishment of the auto-ignition mixture with complete injection of the fuel prior to auto-ignition. Due to the fact that low pressures are employed in injecting the fuel, the fuel itself enters the cylinder at a much lower temperature than is possible when injection takes place under the usual Diesel system. Since the fuel injected is substantially incompressible, all work done in injecting the fuel in the cylinder must be converted to heat in the fuel itself. With the light injection pressure the fuel may enter without in any way approximating decomposition temperatures and may, accordingly, combine with the air to provide a complete auto-ignition mixture before such temperatures are reached. The resultant explosion is, therefore, a soft-burning as differentiated from the detonating characteristics of fuel injected under the usual circumstances.

Figures 17, 20, 21:
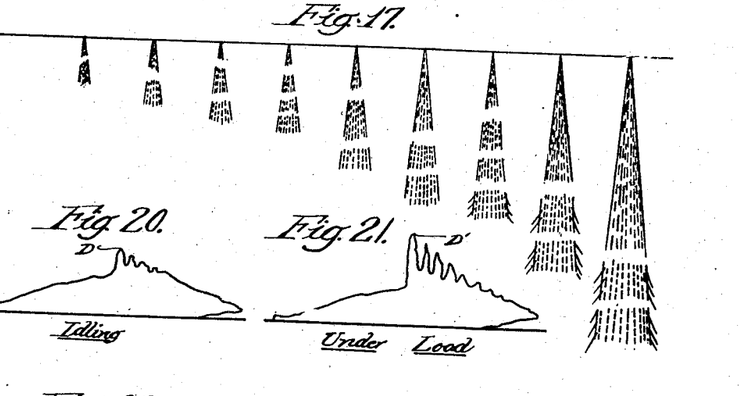
Fig. 17 is a diagrammatic view illustrating the type of spray produced by the nozzle of Fig. 16.
Figs. 20 and 21 are card diagrams showing operation of the engine with the ordinary type of injection.

The vast improvement in operation of an engine operating with fuel injection under the above-outlined circumstances as against the normal injection methods may be visualized by comparing the indicator cards forming Figs. 20 to 23. The indicator cards of Figs. 20 and 21 are cards taken from an engine utilizing the ordinary nozzle and developing a perfect highly atomized compact spray in accordance with the principles of present-day Diesel practice.

It will be noted that a succession of detonation peaks D appear even when the engine is idling, as in Fig. 20. These peaks are much exaggerated when the engine is operating under load, as indicated at D' in Fig. 21. On the contrary when the type of injection just described is employed in the same engine and under the same conditions, these peaks immediately disappear and when idling or under load the engine shows no tendency to the detonations responsible for these peaks (see Figs. 22 and 23).

Through the use of this method of fueling the engine and the nozzle construction hereinbefore described, I am able to produce an engine which is particularly adapted for use in automotive fields. In an engine from which the indicator cards forming Figs. 22 and 23 were taken when using the new fueling system, such engine having 4 cylinders and a bore and stroke of 3³⁵⁄₄₂" and 4" respectively excluding the exhaust port area, when operating at 1800 revolutions produced 150 H. P., at 1,000 revolutions produced 80 H. P. It is, however, operable in the higher automotive ranges; that is to say, 3,000 to 4,000 revolutions.

It will be noted that an engine operated as above described operates neither on the Diesel nor the Otto cycle, differing from the former in that the fuel injection occurs through an extremely short period and entirely prior to combustion; that the injection employed is a spray of loose particles rather than a highly vaporized injection; that an ignition lag is deliberately sought for, to enable the injection to be made prior to combustion, and that volumetric capacity of the engine is greatly increased from the ordinary Diesel, with the result that much higher engine speed can be obtained. It differs from the Otto cycle both in the fact that the volume of air introduced is materially increased, and that the fuel is separately injected.

Since both the method illustrated and the construction described are capable of considerable modification without departing from the spirit of the invention, I do not wish to be understood as limiting myself thereto except as hereinafter claimed.

I claim:

1. An engine comprising a crank shaft, a main working cylinder, a main piston mounted in the main cylinder and operatively associated with the crank shaft, said piston positioned when at the end of its compression stroke in relation with the head of the cylinder to form a large combustion chamber relatively to the displacement of the piston, a supercharging cylinder, a piston in the supercharging cylinder operatively associated with the crank shaft, said cylinders having a transfer passageway connecting the working ends thereof, said supercharging cylinder having an air inlet opening formed therein, a cylindrical valve mounted upon the supercharging cylinder for closing said inlet opening, said inlet valve having an inlet passageway opened to the atmosphere, said valve having a port formed in the cylindrical wall thereof adapted to register with the opening formed in the supercharging cylinder when the valve is rotated, a curved wall forming the end of said passageway in the valve adapted for directing air to said port formed in the cylindrical wall of the valve, and means operatively associated with the crank shaft for rotating said valve.

2. An engine comprising a crank shaft, a main cylinder, a supercharging cylinder, said cylinders positioned in V-shape formation relatively to the crank shaft, a main piston operatively mounted in the main cylinder, a connecting rod connecting the main piston with the crank shaft, a piston in the supercharging cylinder, a connecting rod connecting the last-mentioned piston with the crank shaft, a crank casing upon which the cylinders are mounted forming an enclosed chamber between the pistons and the crank shaft, an air inlet port formed in the supercharging cylinder for admitting air to the crank casing chamber, said cylinders having a scavenging transfer passageway formed therein communicating with the crank case chamber and with the main cylinder adapted to be closed by the main piston during the working stroke of the latter, and open when the main piston is adjacent to the end of its working stroke, the piston in the supercharging cylinder having an opening formed in the wall thereof adapted to register with said scavenging transfer passageway when the main piston is adjacent to the end of its working stroke for admitting scavenging air from the crank casing chamber to the main cylinder, said main cylinder having an exhaust port formed therein, said cylinders having a passageway connecting the working end thereof, a transfer valve for controlling said last-mentioned passageway, and means operatively associated with the crank shaft for operating the transfer valve.

3. An engine having a main cylinder, a supercharging cylinder, pistons in said cylinders, a crank shaft, means for operatively associating said pistons with said crank shaft for operating the piston in the supercharging cylinder in advance of the piston in the main cylinder, a passageway formed in said cylinders connecting the working ends of the cylinders, an inlet valve located in the supercharging cylinder for admitting air to the working end thereof, means for closing the passageway between the working ends of the cylinders prior to the final compression stroke of the piston in the main cylinder, a casing enclosing the crank shaft and forming a compression chamber between the pistons and the crank shaft whereby the pistons will compress the air in said chamber, said cylinders having a passageway formed therein through which air may pass from the said chamber to the working end of the main cylinder for scavenging the latter, said piston located in the supercharging cylinder having an opening formed in the cylindrical wall thereof adapted to register with said passageway for admitting air from the crank case chamber through said passageway into the working end of the main cylinder when the piston in the main cylinder is at the end of its working stroke.

4. In a supercharged engine, working and supercharging cylinders having a common compression base, pistons in said cylinders, an exhaust port in the working cylinder and controlled by the piston thereof, and a port interconnecting the lower ends of said cylinders and controlled by both of said pistons, the piston of the supercharging cylinder having an opening to register with said port.

5. An engine comprising a crank shaft, a main cylinder, a main piston mounted in the main cylinder and operatively associated with the crank shaft, said piston positioned at the end of its compression stroke in relation with the head of the cylinder to form a large combustion chamber relatively to the displacement of the piston, a supercharging cylinder, a piston in the supercharging cylinder operatively associated with the crank shaft, said cylinders having a transfer passageway connecting the working ends thereof, a rotary transfer valve mounted upon said cylinders for controlling said passageway, said valve having a relatively large radial chamber formed therein adapted for retaining pressure therein when the valve is rotated to a position to close said passageway between the cylinders and means operatively associated with the crank shaft for rotating the transfer valve, the chamber of said valve comprising substantially the entire transfer passageway.

6. An engine comprising working and supercharging cylinders, pistons in said cylinders, a port communicating with the upper end of the working cylinder and closed by the piston thereof adjacent the end of its compression stroke, a port constantly communicating with the upper end of the supercharger cylinder and a receiver alternately placing said ports in and out of communication with one another, said receiver being in communication with the supercharger cylinder throughout the compression stroke thereof and after closure of the port of the working cylinder by the piston thereof whereby the final compression of the supercharging cylinder is stored in said receiver, and means to cut off communication between the supercharging cylinder and receiver upon completion of the compression stroke of the working piston and to subsequently place the receiver in communication with the working cylinder at the beginning of the compression stroke thereof.

7. In an engine, working and supercharging cylinders, a connection between the working ends of the cylinders, pistons in said cylinders, a piston of the working cylinder closing said connection prior to the termination of its compression stroke, and means in said connection storing the results of final compression in the supercharging cylinder and subsequently delivering the same to each of the cylinders at the beginning of the compression strokes thereof.

MAX GEORGE FIEDLER.